United States Patent
Bucciero

(10) Patent No.: US 8,134,469 B2
(45) Date of Patent: Mar. 13, 2012

(54) WIRELESS FUEL LEVEL SENSOR FOR A VEHICLE FUEL TANK

(75) Inventor: Matthew Bucciero, Grosse Pointe Woods, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/913,661

(22) Filed: Oct. 27, 2010

(65) Prior Publication Data

US 2011/0181426 A1    Jul. 28, 2011

(51) Int. Cl.
*G08B 21/00*    (2006.01)

(52) U.S. Cl. ............... 340/612; 340/618; 340/572.1; 701/103; 73/290 R

(58) Field of Classification Search ............ 340/612, 340/614, 626, 450.2, 618, 936, 572.1, 572.7; 701/96, 103; 73/290 R, 290 V
See application file for complete search history.

(56) References Cited

U.S. PATENT DOCUMENTS

| | | | |
|---|---|---|---|
| 2,727,355 A | 12/1955 | Wosika | |
| 3,488,723 A | 1/1970 | Veazie | |
| 3,744,463 A | 7/1973 | McFarland, Jr. | |
| 4,759,181 A | 7/1988 | Biritz | |
| 4,800,720 A | 1/1989 | Okada | |
| 4,860,700 A | 8/1989 | Smith | |
| 5,279,266 A | 1/1994 | Landfahrer et al. | |
| 6,295,963 B1 | 10/2001 | Kollock et al. | |
| 6,513,506 B1 | 2/2003 | Ito et al. | |
| 6,661,339 B2 | 12/2003 | Muirhead | |
| 6,672,296 B2 | 1/2004 | Ito et al. | |
| 6,943,678 B2 | 9/2005 | Muirhead | |
| 7,367,294 B2 | 5/2008 | Rozario et al. | |
| 7,458,260 B2 * | 12/2008 | Roesner | 73/290 V |
| 7,821,410 B2 * | 10/2010 | Higashionji et al. | 340/612 |
| 2001/0018932 A1 | 9/2001 | Tokunaga | |
| 2003/0000211 A1 | 1/2003 | Drangel et al. | |
| 2004/0040521 A1 | 3/2004 | Hardin | |
| 2004/0222142 A1 | 11/2004 | Yoshioka | |
| 2005/0193966 A1 | 9/2005 | Mac Vicar et al. | |
| 2007/0051730 A1 | 3/2007 | Vorenkamp et al. | |
| 2007/0215074 A1 | 9/2007 | Rozario et al. | |
| 2009/0126659 A1 | 5/2009 | Lester et al. | |
| 2009/0133762 A1 | 5/2009 | Watanabe et al. | |

(Continued)

FOREIGN PATENT DOCUMENTS

JP    7-304340    11/1995

(Continued)

OTHER PUBLICATIONS

Riegger, John Christopher et al., "Integrated Exhaust Manifold," U.S. Appl. No. 12/857,349, filed Aug. 16, 2010, 44 pages.

(Continued)

*Primary Examiner* — Toan N Pham

(74) *Attorney, Agent, or Firm* — Julia Voutyras; Alleman Hall McCoy Russell & Tuttle LLP

(57) ABSTRACT

A vehicle fuel tank is provided. The vehicle fuel tank includes a housing defining an interior region, a fuel level sensor coupled to the interior region, the fuel level sensor responsive to a fuel pressure, and a radio frequency identification (RFID) device electronically coupled to the fuel level sensor configured to wirelessly transmit a signal indicative of a fuel level in the fuel tank.

18 Claims, 6 Drawing Sheets

U.S. PATENT DOCUMENTS

| | | |
|---|---|---|
| 2009/0151699 A1 | 6/2009 | Honda et al. |
| 2009/0178653 A1 | 7/2009 | Suda et al. |
| 2010/0037595 A1 | 2/2010 | Kaneko et al. |

FOREIGN PATENT DOCUMENTS

| | | |
|---|---|---|
| JP | 2007-247581 | 9/2007 |
| WO | 2009093120 A1 | 7/2009 |

OTHER PUBLICATIONS

Brewer, Todd Jay et al., "Engine with Cylinder Head Cooling," U.S. Appl. No. 12/835,988, filed Jul. 14, 2010, 40 pages.

Correspondence from Scott Muirhead dated Sep. 12, 2011, Nextreme, LLC, 1 page.

* cited by examiner

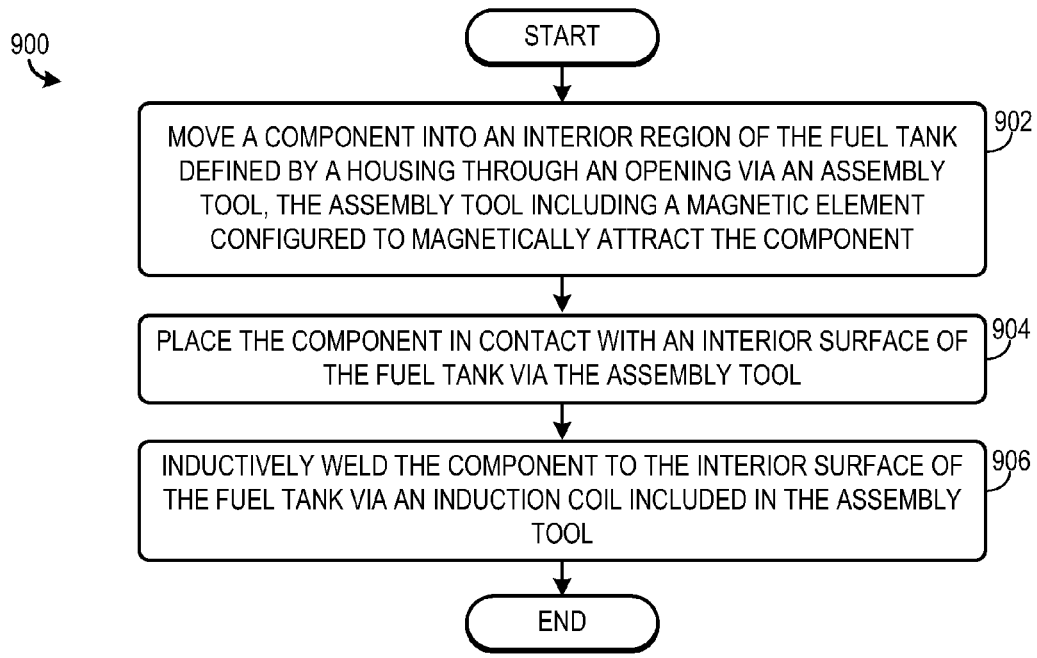

__US 8,134,469 B2__

WIRELESS FUEL LEVEL SENSOR FOR A VEHICLE FUEL TANK

BACKGROUND

Summary

Fuel level sensors, such as float type fuel level sensor, may be used in conjunction with a controller and display gauge to provide a current vehicle fuel level to a driver. Float sensors typically include a float coupled to a potentiometer having a variable resistor that senses fuel level as the float travels up and down in the fuel tank. A controller may receive a signal from the float sensor via a wired connection and the controller may provide an output to a fuel gauge based on the float sensor signal.

However, when a float sensor and other fuel tank components are installed in a fuel tank, the manufacturer may have to put multiple holes in the fuel tank housing. The holes may create permeation pathways from which fuel (e.g., vapor, liquid) can escape, thereby increasing evaporative emission from the vehicle. Additionally, since float sensors may be bulky they may create packaging constraints. Moreover, many fuel tanks may include two or more interior regions between which fuel may not flow freely by means of gravity, such as saddle type fuel tanks. When a single fuel level sensor is installed in a saddle type of fuel tank, it may be difficult to accurately determine the fuel level within the fuel tank. In particular, the fuel reading may be degraded due to intermittent transfer of fuel between the regions of the fuel tank. The accuracy of the fuel level measurements may be increased by adding additional fuel level sensors to the fuel tank. However, the additional fuel sensors may require additional holes to place the fuel level sensors in the fuel tank. Consequently, the evaporative emissions of the vehicle may increase when additional fuel sensors are added to a fuel tank to increase the accuracy of the fuel level reading.

As such, various example systems and approaches are described herein. In one example, a vehicle fuel tank is provided. The vehicle fuel tank includes a housing defining an interior region, a fuel level sensor coupled to the interior region, the fuel level sensor responsive to a fuel pressure, and a radio frequency identification (RFID) device electronically coupled to the fuel level sensor configured to wirelessly transmit a signal indicative of a fuel level in the fuel tank.

In this way, a fuel level sensor may be placed remotely in a fuel tank and wirelessly connected to external components. The remotely placed sensor can provide fuel level information for areas of a fuel tank that may otherwise require an additional hole in the fuel tank. When information from the remotely placed sensor is wirelessly transmitted to a controller, the controller may combine the information with information from other fuel sensors to more accurately determine fuel level in a saddle type fuel tank. In addition, the use of an RFID device in the fuel tank may simplify manufacturing of the fuel tank due to the elimination of wires coupling the fuel level sensor to external components, thereby decreasing production costs. Furthermore, the number of permeation pathways within the fuel tank may also be reduced due to the elimination of wires coupling the fuel level sensor to external components when an RFID device is utilized.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE FIGURES

FIG. 9 shows a method for manufacture of a fuel tank.

DETAILED DESCRIPTION

A vehicle fuel tank is described herein. The vehicle fuel tank includes a housing defining an interior region and a fuel level sensor coupled to the interior region, the fuel level sensor responsive to a fuel pressure. The vehicle tank further includes a radio frequency identification (RFID) device electronically coupled to the fuel level sensor configured to wirelessly transmit an electromagnetic signal indicative of a fuel level in the fuel tank. The RFID device wirelessly transmits a signal indicative of the fuel level within an interior region of the fuel tank to a remotely located receiver device. In this way, additional wires coupling the fuel level sensor to a controller may not be needed. As such, the fuel tank design and manufacturing process may be simplified. In some examples, the RFID device may be a passive RFID device configured to receive power from an electromagnetic field generated via a remote field transmission device. The benefits of the passive device include increased device longevity and the elimination or reduction of batteries and wiring.

Figure 1:
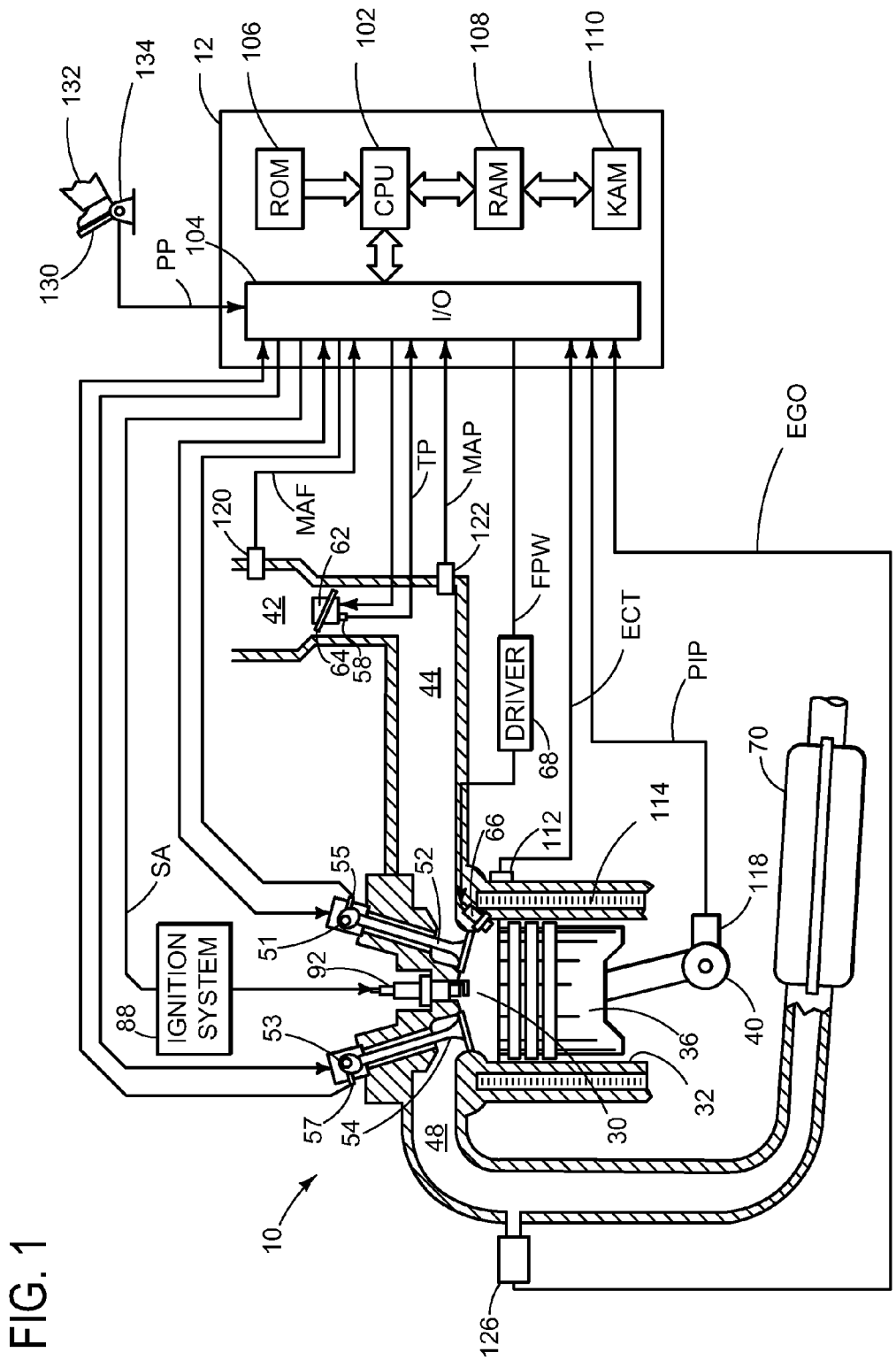
FIG. 1 shows a schematic depiction of an internal combustion engine.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Intake manifold 44 is also shown intermediate of intake valve 52 and air intake zip tube 42. Fuel is delivered to fuel injector 66 by a fuel system (not shown) including a fuel tank, fuel pump, and fuel rail (not shown). The engine 10 of FIG. 1 is configured such that the fuel is injected directly into the engine cylinder, which is known to those skilled in the art as direct injection. Fuel injector 66 is supplied operating current from driver 68 which responds to controller 12. In addition, intake manifold 44 is shown communicating with optional electronic throttle 62 with throttle plate 64. In one example, a low pressure direct injection system may be used, where fuel pressure can be raised to approximately 20-30 bar. Alternatively, a high pressure, dual stage, fuel system may be used to generate higher fuel pressures.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Figure 2:
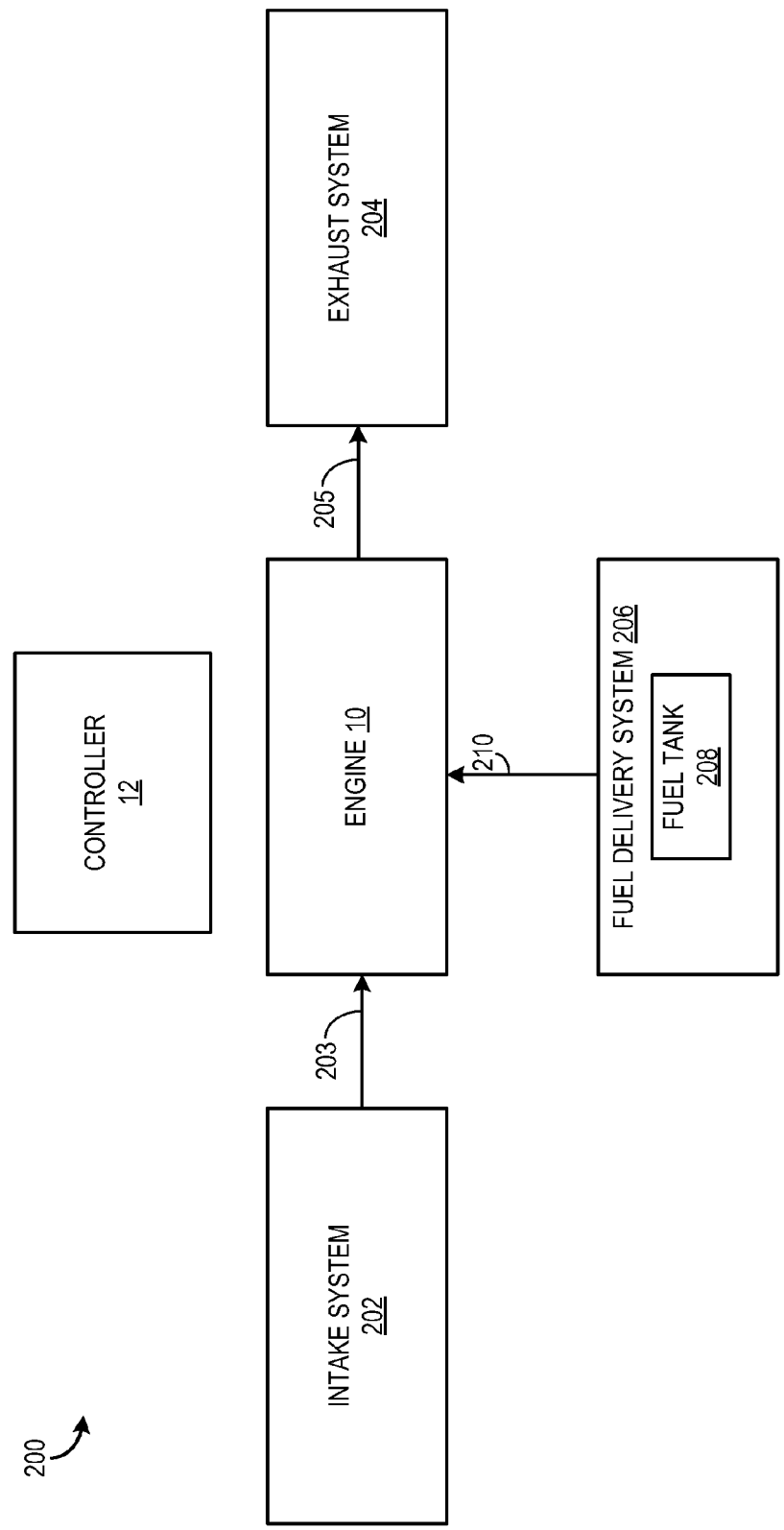
FIG. 2 shows a schematic depiction of a vehicle including the internal combustion engine shown in FIG. 1.

FIG. 2 shows a schematic depiction of a vehicle 200 including an intake system 202 and an exhaust system 204 coupled to engine 10. Arrow 203 depicts the flow of intake air and/or other intake gases into engine 10. Arrow 205 depicts the flow of exhaust gases from engine 10 into the exhaust system. The intake system may include a variety of components such as the throttle as described above Likewise, the exhaust system may include a variety of components such as an emission control device, sensors, etc., as described above.

The vehicle may further include a fuel delivery system 206 having a fuel tank 208. A suitable fuel such as gasoline, diesel, alcohol, biodiesel, etc., may be stored within the fuel tank. Arrow 210 depicts the flow of fuel from the fuel delivery system to engine 10. The fuel tank may include a number of components such as a fuel pump, a fuel level sensor, and an RFID device discussed in greater detail herein.

Figure 3:
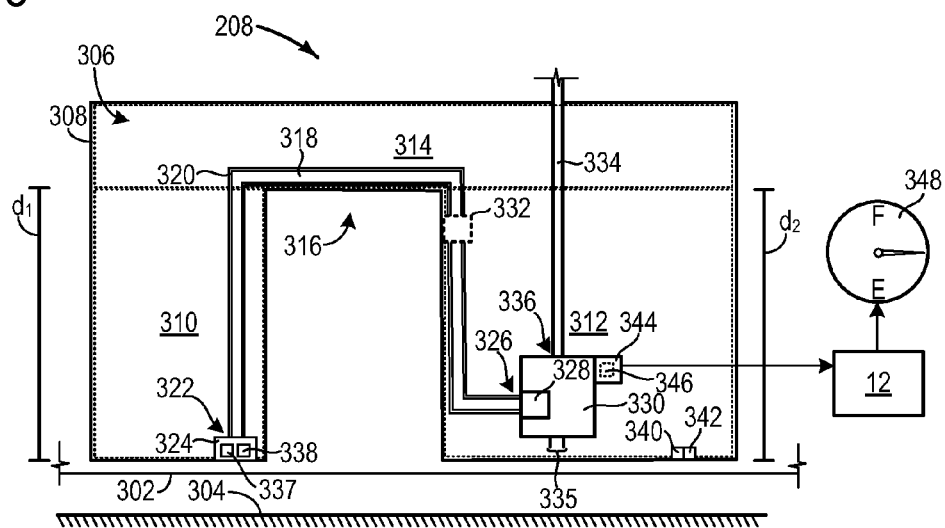
FIG. 3 shows a cross-sectional side view of an example fuel tank included in the vehicle shown in FIG. 2.

FIG. 3 shows a cut away illustration of an example fuel tank 208. As shown, the fuel tank is aligned with a bottom 302 of the vehicle, which is in turn parallel to a level road surface 304. However, in other embodiments the alignment of the fuel tank with respect to the bottom of the vehicle and/or road surface may be altered.

The interior portion 306 of the fuel tank defined by housing 308 is shown including a first interior region 310, a second interior region 312, and a third interior region 314 separating, and positioned between, the first interior region from the second interior region. In this example, the first and second interior region are deeper than the third interior region, thus creating a hump 316 below the third interior region, the third interior region completely separating the first and second interior regions. The first interior region of the fuel tank is at least partially separated from the second interior region of the fuel tank. The regions are arranged such that fuel cannot freely flow by means of gravity between the regions when the vehicle is oriented on a level surface. The saddle shaped fuel tank may be used to increase the vehicle's compactness and driving range. For example, in the vehicle a driveshaft may be positioned below the saddle region. However in other examples, the boundaries and/or geometries of the interior regions of the fuel tank may be altered. For instance, the fuel tank may include a single interior region in other embodiments.

In the depicted embodiment the depth $d_1$ of the first interior region may be equal to the depth of the second interior region $d_2$. However in other examples, the depths of the first and second interior region may not be equivalent. In particular, the bottom of the first interior region may be positioned vertically above the second interior region or vice-versa. When the bottom of the first interior region is positioned vertically above the bottom of a second interior region, the active crossover conduit may act as a siphon during certain operating condition.

Housing 308 may be constructed out of a suitable polymeric material, such as polyethylene (e.g., high density polyethylene). The benefits of a polymeric housing include decreased cost (e.g., material and manufacturing cost), decreased weight, resistance to corrosion, increased durability, and sound transmission properties when compared to housing constructed out of metal. However, in other examples other suitable materials may be utilized to construct the fuel tank. Moreover, the housing may be blow molded. Blow molding includes injecting liquid polymer into a mold cavity and subsequently providing pressurized gas to the mold to expand the liquid polymer and press it against the mold cavity. Further, in some examples, the housing may be overmolded by a suitable material.

The fuel tank may further include an active crossover conduit 318. The active crossover conduit may extend from the first interior region 310 to the second interior region 312 through the third interior region 314. It will be appreciated that active crossover conduit 318 includes a housing 320 defining an interior passage. A first end 322 of the active crossover conduit positioned in the first interior region may include a pick-up 324 configured to draw fuel into the conduit. It will be appreciated that the pick-up may be inductively welded to the housing of the fuel tank. A second end 326 of the active crossover conduit, positioned in the second interior region, may be coupled to a vacuum source 328. The vacuum source may be generated by a fuel pump 330 disposed in the second interior region 312. In some examples, a jet pump circuit may be used to generate the vacuum. It will be appreciated that the jet pump circuit may be coupled in parallel to a pressurized conduit included in the fuel pump. A nozzle may be disposed within the jet pump circuit. An input coupled to the end of the active crossover conduit may be positioned downstream of the nozzle. The nozzle may increase the velocity of the fluid thereby decreasing the fluid pressure generating a vacuum source. In this way, fuel may be drawn into fuel pump 330 from active crossover conduit 318. As described herein, an active conduit may be defined as a conduit that is coupled to a mechanically generated pressure source. In other examples, a vacuum source may be provided to the active crossover conduit via a secondary pump (not shown), such as a positive displacement pump or a rotodynamic pump. In some examples, the active crossover conduit may include a flow valve 332 configured to adjust the flow-rate of the fuel through the conduit. The flow valve may be controlled via controller 12. However, in other examples, the active crossover conduit may not include flow valve 332.

Fuel pump 330 includes an inlet 335 disposed within the second interior region 312. A fuel conduit 334 may be coupled to an output 336 of the fuel pump and extend out of the fuel tank, coupling the fuel pump to downstream components in the fuel delivery system, such as a fuel rail, fuel injectors, and/or high pressure pump. In some embodiments fuel tank 208 may only include a single opening, to decrease permeation pathways. However in other embodiments the fuel tank may include more than one opening.

The flow-rate of fuel pump 330 may also be adjusted via controller 12. In some examples, the fuel pump may be controlled through a pulse width modulation (PWM) signal. Moreover, the output of the fuel pump may be discretely controlled through a selected number of outputs or in other examples the output of the fuel pump may be continuously variable.

A fuel level sensor 337 responsive to a fuel pressure in the fuel tank is disposed within the first interior region. In some examples, the fuel level sensor may be a strain gauge configured to alter an electrical resistance in response to a pressure exerted on a surface of the sensor. For example, as the pressure in the fuel tank increases the resistance in the strain gauge may decrease or vice-versa. Thus, the resistance in the strain gauge may be indicative of a pressure in the region of the fuel tank in which the strain gauge is located.

Figure 4:
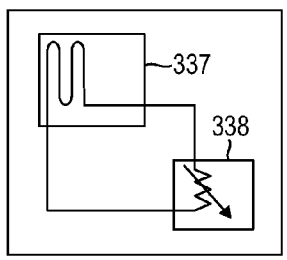
FIG. 4 shows an example strain gauge and radio frequency identification (RFID) device that may be included in the fuel tank shown in FIG. 3.

Fuel level sensor 337 may be electrically coupled to an RFID device 338 (e.g., RFID tag) configured to wirelessly transmit an electromagnetic signal indicative of a fuel level in the first interior region of the fuel tank. The fuel level sensor and/or RFID device may be inductively welded to housing 308 of the fuel tank. An example fuel level sensor and RFID device are illustrated in FIG. 4. RFID device 338 may be a passive RFID device configured to receive power from an electromagnetic field. The electromagnetic field may be generated via a remote field transmission device discussed in greater detail herein. It will be appreciated that the passive RFID device may receive an electromagnetic field that powers the device and in response to reception of the electromagnetic field generate an electromagnetic signal. Further, the remotely generated electromagnetic field may be generated at predetermined intervals to conserve energy. For example, the electromagnetic field may be generated at vehicle key on and at predetermined intervals (e.g., every two minutes). It will be appreciated that passive RFID devices may require little or no maintenance. Thus, the passive RFID device may have an extensive lifespan, when compared to other devices such as active RFID devices. However in other embodiments, the RFID device may be an active RFID device configured to receive electrical power from a wired input. For example, the RFID device may have batteries coupled thereto or integrated therein. The wired input may also be wires extending from fuel pump 330. When RFID device 338 is active it may be configured to wirelessly transmit a signal indicative of a fuel level in the first interior region of the fuel tank at predetermined time intervals.

As shown, fuel level sensor 337 and/or RFID device 338 are integrated into pick-up 324, to simplify fuel tank assembly and construction. However in other examples, the fuel level sensor 337 and/or RFID device 338 may be coupled to the housing of the fuel tank in the first interior region. In this way, the fuel level sensor is position at a location in the fuel tank remote of fuel pump 330. Specifically, the fuel level sensor may be coupled to the lowest vertical point in the first interior region 310. However in other examples, the fuel level sensor may not be coupled to the lowest vertical point in the first interior region of the fuel tank.

Additionally, a second fuel level sensor 340 may be positioned in the second interior region 312. In some examples, the second fuel level sensor may be substantially identical to the first fuel level sensor. However in other examples, other suitable fuel level sensors may be utilized. The second fuel level sensor may be coupled to a second RFID device 342 configured to wirelessly transmit an electromagnetic signal indicative of a fuel level in the fuel tank. However, in other examples the second fuel level sensor may be wired to a controller (e.g., controller 12). Specifically, the second fuel level sensor may be electrically connected with mechanical contacts or soldered joints blade terminals to fuel pump 330 which is electrically coupled to controller 12. Further, in some examples, the second fuel level sensor may be coupled to fuel pump 330 and the second RFID device 342 may not be included in the fuel tank. Therefore, the second fuel level sensor 340 may be coupled other components via a wired connection.

A receiver device 344 configured to receive the electromagnetic signal generated via the first and/or second RFID device may be included in the vehicle. As illustrated, receiver device 344 is coupled to fuel pump 330. However in other examples, receiver device 344 may be coupled to another suitable location in the fuel tank or external to the fuel tank, such as in an electronic component cluster. The receiver device may be in wired and/or wireless communication with controller 12 or another suitable controller configured to determine an amount of fuel contained within the tank from the signals generated by the RFID devices.

When a passive RFID device is utilized a remote field transmission device 346 may also be included in the vehicle. As shown, the remote field transmission device is integrated into receiver device 344. However in other examples, the remote field transmission device may be positioned in another suitable location adjacent to or spaced away from the receiver device. Specifically, in some examples the remote field transmission device may be positioned outside the fuel tank. It will be appreciated that the remote field transmission device may be configured to transmit an electromagnetic field at predetermined time intervals.

Further, it will be appreciated that the first and second RFID devices (338 and 342) may transmit, via wireless communication, signals indicative of a fuel level in the first and second region of the fuel tank to receiver device 344. When a passive RFID device is used an electromagnetic field (e.g., signal) may be sent from remote field transmission device 346 to the first and/or second RFID device prior to transmission of the signals indicative of a fuel level in the first and second regions of the fuel tank. The passive RFID devices receive power from the electromagnetic field generated via the remote field transmission device and subsequently generate electromagnetic signals modified by the fuel level sensors that are indicative of fuel levels in the regions of the fuel tank in which they are positioned.

After the signals indicative of the fuel levels in both the first and second region of the fuel tank a computing device, such as controller 12, coupled to receiver device 344 may determine an aggregate amount of fuel within the fuel tank. It will be appreciated that when the fuel tank has a single interior region, the signal indicative of the fuel level within the first region may be indicative of the fuel level within the entire fuel tank.

In one example, controller 12 may utilize one or more look-up tables to determine the amount of fuel contained within the fuel tank from the signals generated via the RFID devices. It will be appreciated that the vapor pressure within the fuel tank and/or the fuel composition may also be taken into account when determining the amount of fuel in the fuel tank. A method used to determine the amount of fuel in the fuel tank is discussed in greater detail herein with regard to FIG. 8. The computing device (e.g., controller 12) configured to determine an amount of fuel contained within the fuel tank may be coupled to a fuel gauge 348 configured to indicate the amount of fuel to the operator of the vehicle. Although a needle type gauge is depicted it will be appreciated that other suitable gauges may be utilized. Various techniques may be used to reduce rapid fluctuations in the output provided by fuel gauge 348 caused by rapid vehicle movement. For example, the fuel level signal may be passed through a low pass filter before being displayed to the operator.

FIG. 4 illustrates an example fuel level sensor 337 in the form of a bonded strain gauge electrically coupled to an example RFID device 338. The bonded strain gauge may be integrated into an overmolded or welded plastic encasement. The plastic encasement may be attached and/or otherwise integrated into a large number of fuel tank designs. The bonded strain gauge may include a grid of fine wires or foil bonded to a backing or carrier matrix. In some examples, the electrical resistance of the grid may vary linearly with strain (i.e., pressure). However, other relationships between resistance and strain are possible. It will be appreciated that the bonded strain gauge may be more compact than a float type fuel sensor, thereby reducing the packaging constraints of the fuel level sensor. In this way, more compact fuel tanks may be designed.

During fuel tank operation, a varying fuel levels produces a variable force that is applied to the strain gauge (e.g., distributed pressure over a grid surface of the strain gauge). Therefore, the force on the strain gauge is determined by measuring the change in resistance in the strain gauge. The strain corresponds to a pressure which in turn corresponds to a fuel height above the strain gauge. There are several advantages to using a bonded resistance strain gauge including the low cost, when compared to other fuel sensors such as float type fuel sensors. Moreover, the bonded strain gauge may be manufactured with a short gage length. Further, the strain gauge may be only moderately affected by temperature changes. In addition, the strain gauge is small in size, it has a low mass, and it has a high sensitivity to strain.

As shown, the RFID device 338 and bonded strain gauge form a circuit. As the fuel level fluctuates in the fuel tank the resistance in the bonded strain gauge will correspondingly fluctuate, as discussed above. The resistance of the strain gauge modifies an electromagnetic signal generated by the RFID device. In this way, an electromagnetic signal indicative of a fuel level in the fuel tank may be wirelessly transmitted via the RFID device. However, it will be appreciated that other types of fuel level sensor may modify the electromagnetic signal generated by the RFID device to generate a signal indicative of a fuel level in the fuel tank.

Figure 5:
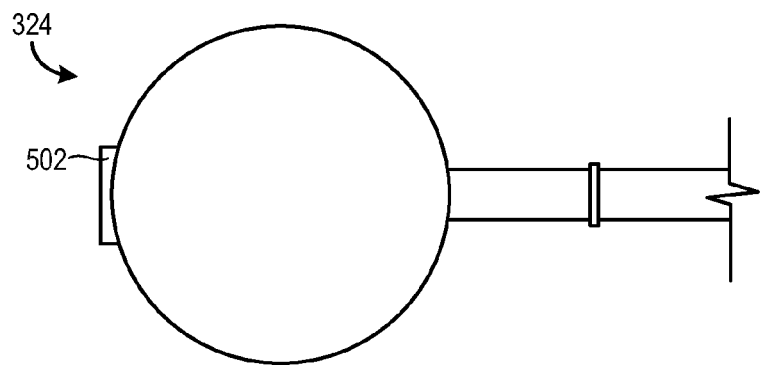
FIGS. 5-7 show various views of a fuel pick-up that may be included in the fuel tank depicted in FIG. 3.
Figure 6:
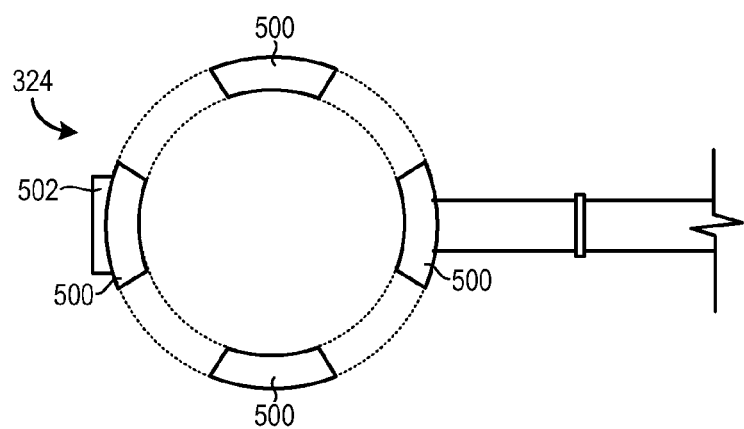
Figure 7:
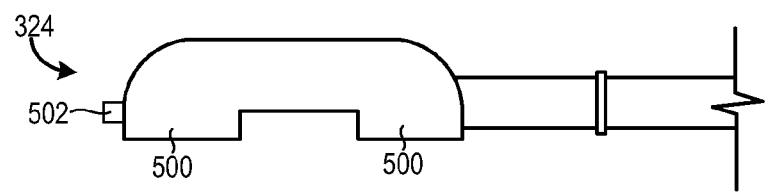

FIGS. 5-7 illustrate a number of views of an example pick-up 324. In particular, FIG. 4 shows a top view of the pick-up, FIG. 5 shows a bottom view of the pick-up, and FIG. 6 shows a side view of the pick-up. It will be appreciated that the pick-up may be positioned on a bottom portion of the second interior region of the fuel tank shown in FIG. 3, as previously discussed.

Pick-up 324 may include a plurality of legs 500. As shown the pick-up includes four legs. However, an alternate number of legs may be utilized in other embodiments. An example active crossover conduit 318 is fluidly coupled to the pick-up. As previously discussed, the active crossover conduit may be coupled to fuel pump 330 shown in FIG. 3. An overmolded structure 502 may be coupled to pick-up 324. It will be appreciated that overmolded structure 502 may include fuel level sensor 337 and RFID device 338, shown in FIG. 3.

Figure 8:
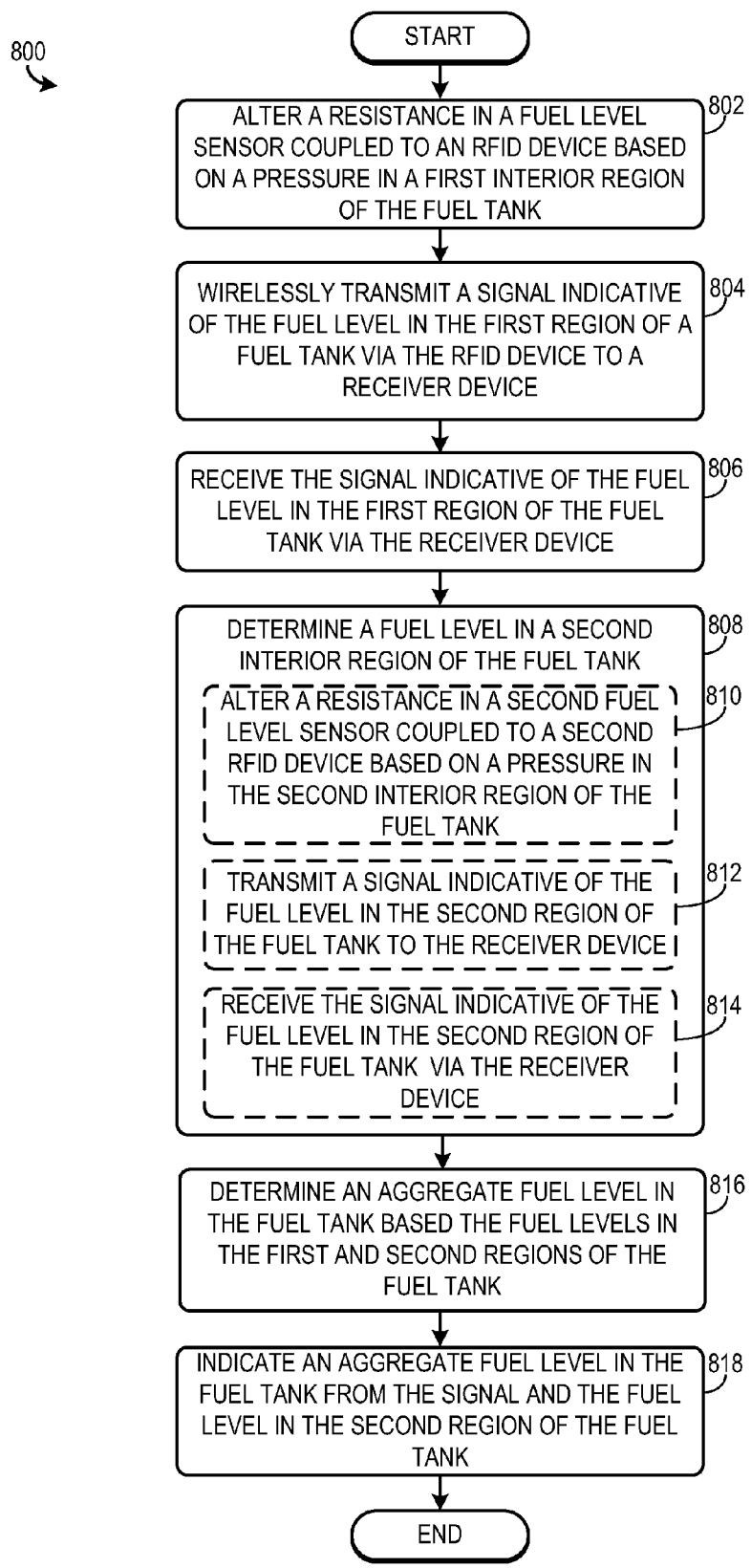
FIG. 8 shows a method for indicating a fuel level in a fuel tank of a vehicle.

FIG. 8 shows a method for operation of the fuel level sensor. It will be appreciated that method 800 may be implemented by the systems and components described above or may be implemented via other suitable systems and components.

At 802, method 800 includes altering a resistance in a fuel level sensor coupled to an RFID device based on a pressure in a first interior region of the fuel tank. Next at 804, the method includes wirelessly transmitting a signal indicative of the fuel level in the first region of a fuel tank via the RFID device to a receiver device. In one example, the signal indicative of the fuel level is transmitted in response to a periodically broadcast electromagnetic signal that powers up the RFID device. The periodic broadcast may occur at predetermined timings. For example, the electromagnetic signal may be broadcast upon vehicle key on and every two minutes thereafter. It will be appreciated that the receiver may be coupled to or integrated into a controller configured to determine an amount of fuel contained within the fuel tank.

At 806, the method includes receiving the signal indicative of the fuel level in the first region of the fuel tank via the receiver device. Next at 808, the method includes determining a fuel level in a second interior region of the fuel tank. It will be appreciated that step 808 may be implemented via a controller electronically coupled to the receiver device. Specifically, in some examples, the receiver device may be integrated into the controller. However, in other examples, the receiver device may be spaced away from the controller.

In some examples at 810, determining a fuel level in a second interior region may include altering a resistance in a second fuel level sensor coupled to a second RFID device based on a pressure in the second interior region of the fuel tank. Further, in some examples determining a fuel level in a second interior region may include at 812 transmitting a signal indicative of the fuel level in the second region of the fuel tank to the receiver device. Still further, in some examples at 814, determining a fuel level in a second interior region may include receiving the signal indicative of the fuel level in the second region of the fuel tank via the receiver device. It will be appreciated that other techniques may be used to determine the amount of fuel in the second region of the fuel tank. For example, the second fuel level sensor may be wired to the controller.

At 816, the method includes determining an aggregate fuel level in the fuel tank based the fuel levels in the first and second regions of the fuel tank. It will be appreciated that the controller may use additional inputs to determine the amount of fuel contained within the fuel tank such as the vapor pressure within the fuel tank, fuel tank temperature, engine temperature, ambient air pressure and/or temperature, etc. As previously discussed, look-up tables may be used to determine the aggregate fuel level in the fuel tank. The look-up table may increase the speed of the calculation as well as decrease the amount of processing resources needed to process the request. At 818, the method includes indicating an aggregate fuel level in the fuel tank from the signal and the fuel level in the second region of the fuel tank. Method 800 enables the fuel level in the fuel tank to be quickly and easily determined.

FIG. 9 shows a method 900 for manufacture of a polymeric fuel tank. Method 900 may be implemented by the systems and components described herein or may be implemented by other suitable systems and components.

At 902, method 900 includes moving a component into an interior region of the fuel tank defined by a housing through an opening via an assembly tool, the assembly tool including a magnetic element configured to magnetically attract the component. It will be appreciated that the component may be a fuel pick-up coupled to a fuel pump having an integrated fuel level sensor and an RFID device integrated therein. However in other examples, the component may be a fuel level sensor such as a strain gauge coupled to an RFID device. It will be appreciated that the component may be at least partially constructed out of a polymeric material. Specifically, the polymeric material may overmold the fuel level sensor and RFID device. In some examples, the polymeric material (e.g., high density polyethylene) may be substantially identical to the polymeric material used to construct the housing of the fuel tank. Further in some examples, the fuel tank may include only a single opening.

Next at 904, the method includes placing the component in contact with an interior surface of the fuel tank via the assembly tool. In some examples, the interior surface may be located in a first region of a fuel tank spaced away from a second region of the fuel tank, the second region having a fuel pump positioned therein. Next at 906, method 900 includes inductively welding the component to the interior surface of the fuel tank via an induction coil included in the assembly tool. In this way, a component, such as a fuel level sensor may be integrated into a fuel tank using a single opening. Moreover, the induction welding allows the component to be secured to the fuel tank housing without boring additional holes in the fuel tank. In this way, the number of permeation pathways in the fuel tank is reduced, thereby decreasing evaporative emission.

It will be appreciated that the configurations and/or approaches described herein are exemplary in nature, and that these specific embodiments or examples are not to be considered in a limiting sense, because numerous variations are possible. The subject matter of the present disclosure includes all novel and nonobvious combinations and subcombinations of the various features, functions, acts, and/or properties disclosed herein, as well as any and all equivalents thereof.

The invention claimed is:

1. A vehicle fuel tank, comprising:
   a housing defining an interior region;
   a fuel level sensor coupled to the interior region, the fuel level sensor responsive to a fuel pressure, the fuel level sensor being a wireless device and positioned at a location in the fuel tank remote from a fuel pump, the fuel pump within the fuel tank and part of a module; and
   a radio frequency identification (RFID) device electronically coupled to the fuel level sensor configured to wirelessly transmit a signal indicative of a fuel level in the fuel tank, the module providing power to the RFID device via an electromagnetic field.

2. The vehicle fuel tank of claim 1, where the fuel level sensor includes a strain gauge, an electrical resistance of the strain gauge altered in response to a pressure of a fuel stored in the fuel tank.

3. The vehicle fuel tank of claim 2, where the RFID device is a passive RFID device configured to receive power from an electromagnetic field generated via a remote field transmission device, and where the passive RFID device wirelessly transmits the signal in response to a change in the electrical resistance of the strain gauge, the signal modified by the change in electrical resistance.

4. The vehicle fuel tank of claim 1, where the RFID device is an active RFID device configured to receive electrical power from a wired input.

5. The vehicle fuel tank of claim 1, where the fuel level sensor is overmolded via a polymeric material.

6. A vehicle fuel tank, comprising:
   a fuel tank housing with first and second interior regions;
   a fuel pump positioned in the first interior region;
   a fuel pick-up positioned in the second interior region and in fluid communication with the fuel pump;
   a wireless fuel level sensor positioned within the second interior region, the wireless fuel level sensor including a strain gauge, an electrical resistance of the strain gauge altered responsive to a fuel level pressure.

7. The vehicle fuel tank of claim 6, where the fuel pick-up is a fuel pick-up module that is coupled to an active crossover conduit, the active crossover conduit fluidly coupling the fuel pick-up and the fuel pump.

8. The vehicle fuel tank of claim 6, where the wireless fuel level sensor is electrically coupled to a radio frequency identification (RFID) device configured to wirelessly transmit a signal modified by the alteration in electrical resistance in the strain gauge.

9. The vehicle fuel tank of claim 8, where the RFID device is a passive RFID device configured to receive power from an electromagnetic field generated via a remote field transmission device.

10. The vehicle fuel tank of claim 9, where the remote field transmission device is included in an electronic component cluster positioned in the vehicle outside of the fuel tank.

11. The vehicle fuel tank of claim 9, where the remote field transmission device is positioned in the first interior region.

12. The vehicle fuel tank of claim 6, where the fuel tank housing is blow molded.

13. The vehicle fuel tank of claim 6, where the vehicle fuel tank includes a single opening.

14. The vehicle fuel tank of claim 6, further comprising a second wireless fuel level sensor positioned within the first interior region, the second wireless fuel level sensor including a second strain gauge, an electrical resistance of the strain gauge altered responsive to a fuel level pressure.

15. A method for indicating fuel level, comprising:
- wirelessly transmitting a signal indicative of the fuel level in a first interior region of a fuel tank via a radio frequency identification (RFID) device;
- indicating an aggregate fuel level in the fuel tank from the signal and the fuel level in a second interior region of the fuel tank; and
- preceding the transmitting, altering a resistance in a fuel level sensor coupled to the RFID device based on a pressure in the first interior region of the fuel tank.

16. The method of claim 15, where the RFID device is a passive device, and where an increased amount of fuel is drawn from one of the first or second interior regions when the other of the first and second interior regions is at a higher level.

17. The method of claim 16, where the RFID device wirelessly transmits the signal to a receiver device positioned in the second interior region of the fuel tank.

18. The method of claim 17, where the RFID device wirelessly transmits the signal at predetermined intervals.

* * * * *